United States Patent [19]

Bunge

[11] 4,432,096
[45] Feb. 14, 1984

[54] ARRANGEMENT FOR RECOGNIZING SOUNDS

[75] Inventor: Ernst Bunge, Hamburg, Fed. Rep. of Germany

[73] Assignee: U.S. Philips Corporation, New York, N.Y.

[21] Appl. No.: 301,869

[22] Filed: Sep. 14, 1981

[51] Int. Cl.³ .............................................. G10L 1/00
[52] U.S. Cl. ................................................... 381/43
[58] Field of Search .............. 179/1 SC, 1 SD, 1 SE, 179/1 SB; 340/146.3 AQ, 146.3 WD; 324/77; 381/43, 41, 42

[56] References Cited

U.S. PATENT DOCUMENTS 2,575,909 11/1951 Davis et al. ...................... 179/1 SD
3,755,627 8/1973 Berkowitz et al. .............. 179/1 SD

OTHER PUBLICATIONS

General Electric, "GE Transistor Manual", GE Company, U.S.A., 1964, pp. ii and 199.
D. Lancaster, "RTL Cookbook", Sams, 1971, p. 35.

Primary Examiner—E. S. Matt Kemeny
Attorney, Agent, or Firm—James J. Cannon, Jr.

[57] ABSTRACT

Sounds or speech signals are converted into an electrical sound and broken down into separate spectral components in a filter bank. These components are integrated over a short period of time and produce a short-time spectrum of the signal. The spectal components are applied, via a corresponding number of parallel leads, to a number of pattern detectors which supply an output signal only if the short-time spectrum corresponds to the pattern adjusted in the relevant pattern detector. To this end, each pattern detector includes two threshold value (window) detectors which supply a signal if the applied input signal lies between two adjustable thresholds. Each threshold value detector is connected to a different output of the filter bank for another spectral range and is generally adjusted to different threshold values. The outputs of the threshold value detectors are combined via an AND-element, so that a signal is produced only if all threshold value detectors of the pattern detector are activated. For each sound or for each phoneme in the case of speech, a pattern detector is provided. When series of sounds or signals are recognized, the series of addresses of the pattern detectors which have successively generated an output signal are stored and subsequently applied to the computer for comparison.

5 Claims, 6 Drawing Figures

ARRANGEMENT FOR RECOGNIZING SOUNDS

This application is a continuation of Ser. No. 946,928, filed Sept. 28, 1978, now abandoned which was continuation of Ser. No. 713,517, filed Aug. 11, 1976, now abandoned.

BACKGROUND OF THE INVENTION

1. Field of the Invention

The invention relates to an arrangement for use in the recognition of sounds, comprising a filter bank adapted for receiving the sound which has been converted to an electrical signal on an input of said filter bank, and which filter bank is adapted for dividing said electrical signal in a predetermined number of frequency bands and for supplying the energy of said signal, over fixed periods of time on separate outputs per frequency band, while a device which is connected to the outputs is adapted for comparing the succession in the time of the energy distribution patterns over the frequency band with predetermined patterns.

2. Description of the Prior Art

An arrangement of this kind is known from German Offenlegungsschrift No. 2,363,590. Therein, the integrated output signals of the filter bank are applied to a computer via a multiplexer and an analog-to-digital converter. The spectral distribution of the signal to be examined, integrated over a short period of time, represents a multi-dimensional vector, so that the computer receives a time succession of different vectors which is compared with known successions. For the representation of a vector, however, a large number of bits are required, so that long vector successions require a large storage capacity and a substantial processing time, even in the case of fast computers, so that real time processing is hardly feasible without very large and fast and hence expensive computers being required.

SUMMARY OF THE INVENTION

The invention has for its object to provide an arrangement whereby a number of different sounds can be simply recognized in real time. It is a further object of the invention to provide a simple and effective preprocessor for the sound signals. The objects are realized in that the invention is characterized in that there are provided a number of patterns detectors (4) each of which is connected to at least part of the outputs (5) of the filter bank (3), each pattern detector comprising, for each connected output, a threshold value or window detector (10) which is adapted for producing a signal level on its output when the signal on the output of the filter bank connected to said detector lies between a lower (fu) and an upper (fo) threshold value, an AND-element (6) in each pattern detector combining the outputs of all threshold value detectors contained therein and being adapted for producing a signal level on its output, representing the output of the pattern detector, if a signal level is produced on all outputs of the threshold value (window) detectors, said arrangement furthermore comprising a storing device (7,8,9) which is connected to the pattern detectors for storing the succession in the time of the signal levels on the outputs of the pattern detectors and applying this succession to a comparison device. The spectral distribution of the signal to be examined in each period of time, i.e. each vector, is considered as a spectral pattern which, related to human speech, corresponds to a phoneme in known manner. Because the spectral distribution of the phonemes is speaker-dependent, but can partly have substantial tolerances, an upper and a lower threshold value is used for each spectral part in each phoneme. Preferably, these threshold values are adjustable, preferably independently of each other. A very substantial data reduction is thus obtained, because the computer does not receive all feasible vectors, but only the vectors or patterns actually occurring, the computer already decoding these vectors.

A threshold value detector can be very simply composed of only two comparators, for example, operational amplifiers, which are followed by an interconnection member. Thus, a pattern detector has a very simple construction, even if it comprises large number of threshold value detectors for a large number of spectral ranges and hence for a fine resolution of the pattern, so that an inexpensive arrangement is obtained also in the case of a large number of pattern detectors for a correspondingly large number of different sounds or phonemes. Preferably, an address is assigned to each pattern, while a store stores, in coded form, the addresses of the pattern detectors which supply an output signal, and these coded address sequences are applied to the device for comparison with predetermined pattern sequences. It is thus possible, for example, to recognize the succession of operating conditions of machines, such as generators or vehicles, which become apparent as different operating noises, by presenting the correspondingly coded address series of the pattern detectors as comparison values. Similarly, such a sequence or set of addresses can be used for voice recognition as a characteristic for the sequence of phonemes, i.e. a word or a sequence of words.

The set or the sets of addresses can be realized by an adaptive pattern recognition program. According to this program, a number of known prototypes, characterized by their characteristic threshold value address sequence, are written during a learning phase for a word to be recognized. In the program the frequency distribution of the address sequences is established and stored.

This is effected for each word to be recognized in the planned vocabulary. In order to make the system operate speaker-independently as much as possible, it makes sense to have different human speakers speak the prototypes for each word to be learned. After completion of the learning phase, the frequency distributions of the address sequences for each word to be recognized are stored in the computer.

If a word is to be recognized after completion of the learning phase, the spectrum produced via the microphone and the filter bank is applied to the pattern detectors, and the addresses thereof are coded in accordance with the succession of the output signals, applied to a computer, and compared word-wise with the frequency distributions of the vocabulary learned. The word whose frequency distribution offers the highest value for the instantaneous address sequence is considered as having been recognized.

If a recognition of complete sentences is to be performed, the reliability of the system can be increased by including syntactic rules for the feasible succession of words.

BRIEF DESCRIPTION OF THE DRAWINGS

Embodiments in accordance with the invention will be described in detail hereinafter with reference to the drawing.

DESCRIPTION OF THE PREFERRED EMBODIMENT

Figure 1:
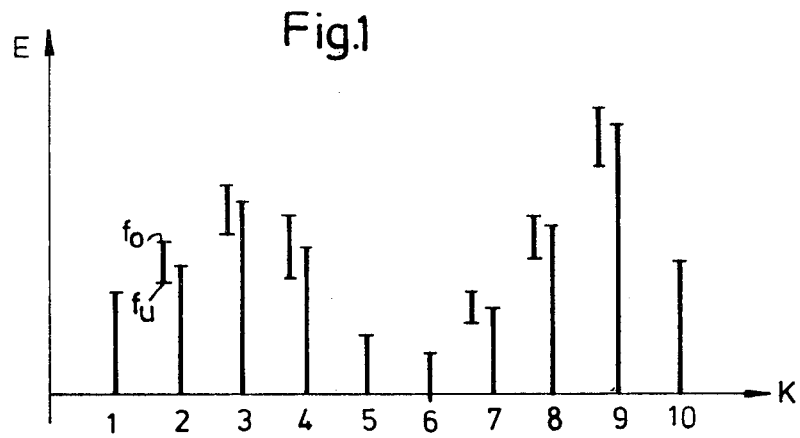
FIG. 1 shows an example of a signal frequency spectrum with associated tolerance intervals.
Figure 2:
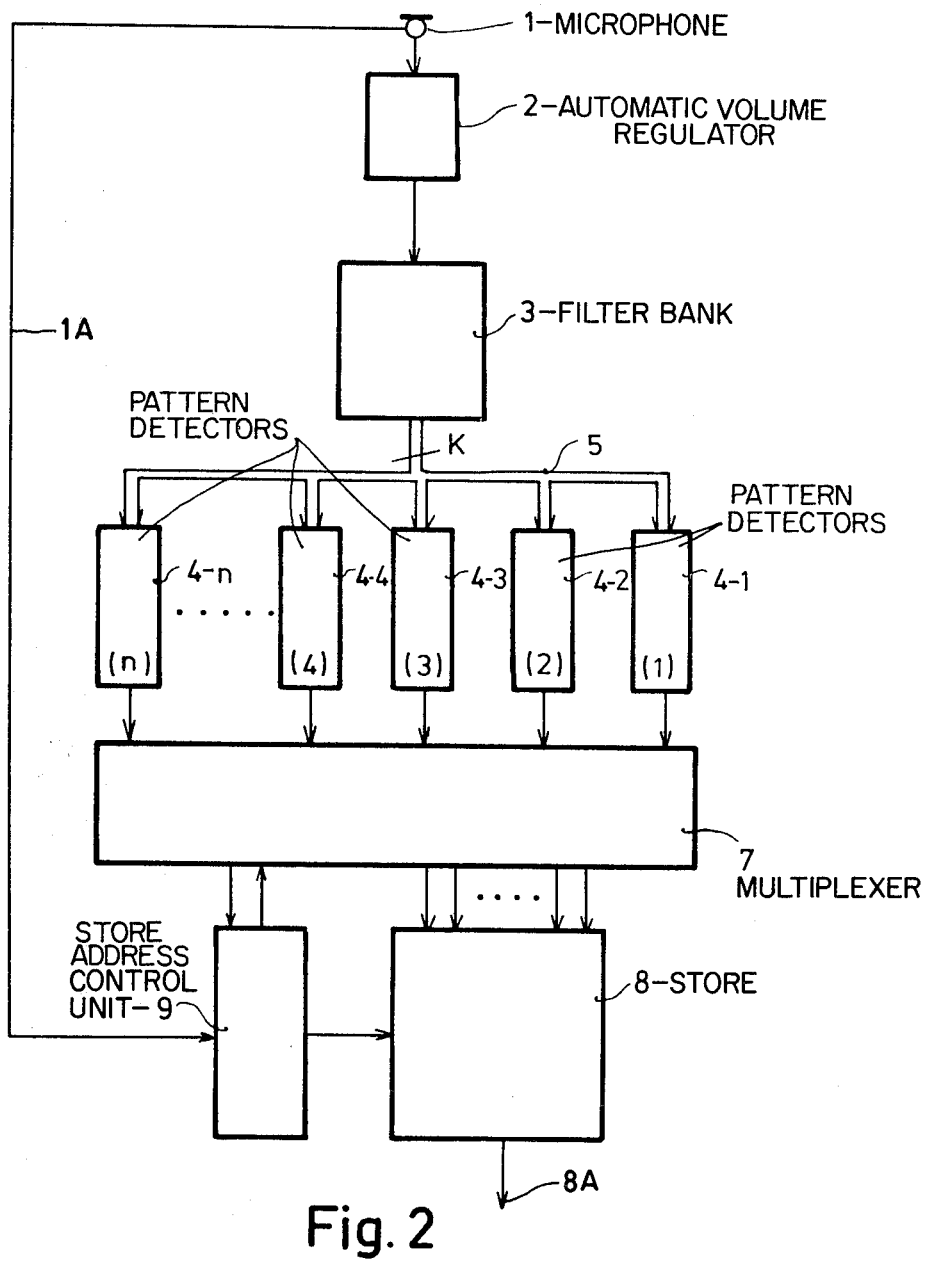
FIG. 2 shows a block diagram of the complete arrangement, according to the invention.

The spectrum shown in FIG. 1 is obtained by means of the arrangement shown in FIG. 2. Therein, the sound to be recognized or the sound sequence to be recognized is received on a microphone 1 and thereby converted into an electric signal. This electric signal is applied to an automatic volume regulator 2, wherein the electrical time function is standardized as regards amplitude. Automatic volume control is well known in the technique of sound reproduction is, therefore, not being described further. In this way the recognition or classification is made independent of the overall sound volume, which has proved essential for speech recognition and the like. In a filter bank 3 the output signal of regulator 2 is broken down into a predetermined number K of successive frequency ranges of spectral components, for example by a set of respective ringing circuits or narrow-band filters which all receive the input signal and produce output signals in parallel. The resulting signals are rectified and integrated over fixed time intervals of, e.g., 10 mS by integrating members not shown, but which may be conventional RC-networks. Alternatively, a clocked operation may be used, each clock pulse driving the termination of said integration interval and driving the appearance of the integration results at the outputs of the filter bank. In that case, also the subsequent elements of the arrangement are provided with synchronizing clock pulse inputs but this system is not discussed further. The signals of the respective rectified and integrated spectral components are output from the filter bank 3 via the channel 5. The values of the signal or the voltage on the individual outputs are proportional to the energy content integrated over said integration time of the spectral component, of which an example has been given in FIG. 1 illustrating ten individual outputs. This energy distribution will generally be time-dependent at least for some spectral components in case of a non-stationary sound.

Each of the K individual outputs from filter bank 3 may be connected in parallel to anywhere from 1 to n of the pattern detectors 4 (1) . . . 4(n) in FIG. 2. Each one of the pattern detectors checks whether or not the voltages of the individual K outputs are situated within a tolerance range between a lower threshold fu and an upper-threshold fo, said thresholds having been specifically defined for each individual pattern detector. FIG. 1 shows some of these tolerance ranges, denoted by vertical strokes, as they may occur in one of the pattern detectors, a tolerance range of this kind not being shown for each channel, because it has been found that for the various sounds there are usually some channels which are not very important for the identification of the sound. Thus, the complexity can be reduced and the reliability of the recognition can even be increased somewhat. The example of FIG. 1 shows that the signals for the channels 2-4 and 7-9 are situated within the relevant tolerance ranges, so that the corresponding pattern detector would produce a positive output signal. However, if the signal of only one channel were not within the tolerance range, the pattern detector would fail to produce an output signal. FIG. 1 also shows that the individual tolerances ranges for the various channels are not equally large, because for speech recognition the deviations of the signals in the various channel outputs, determined by various speakers, may be unequally large.

Figure 3:
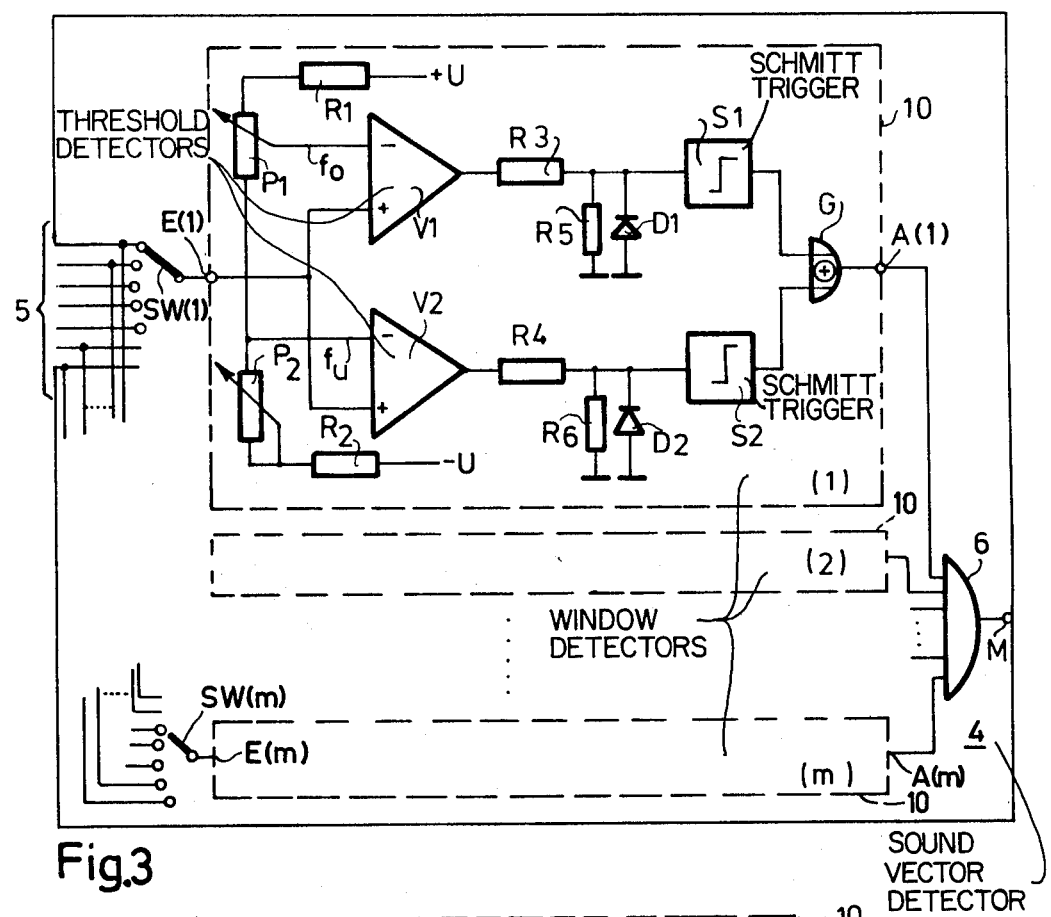
FIG. 3 shows the construction of a pattern detector comprising a first embodiment of a threshold value detector.

FIG. 3 shows an example of the interior construction of a pattern detector 4 of FIG. 2. This Figure shows a number of threshold value (window) detectors 10(1) to 10(m) denoted by broken lines whose outputs A(1) to A(m) are all combined via an AND-element 6 in the sound vector detector 4. The output M of the sound vector detector 4 generates an output signal, as already described, only if the outputs A(j) of all threshold value detectors 10(1) to 10(m) simultaneously generate a positive output signal.

Each of the inputs E(1) . . . E(m) of each threshold value detector 10 is connected to a first connection of a corresponding switch SW(1) . . . SW(m) shown in FIG. 3. Each switch is connected to the bus 5, which is shown in FIG. 2 to have K lines (K a positive integer), which selects one of the K outputs of filter bank 3. Alternatively, the input side of each switch may be connected to only a fraction of those outputs, the switch SW(1) being connected to only the outputs having the lowest numbers of the sequence (1 . . . ), the switch SW(2) being connected to the next outputs in an overlapping manner, until finally the last switch SW(m) is connected only to the channels having the highest numbers of the sequence ( . . . K). Obviously, this is a preferable arrangement if the value of m is smaller than the value of K.

Each window detector 10 comprises two threshold detectors or comparators V1 and V2 for which operational amplifiers are used in this case. The non-inverting input of the operational amplifiers, denoted by the symbol +, is connected to the respective input (E(j), while the inputs denoted by the symbol-receive threshold voltages produced by the series connection of two resistors R1 and R2 and two potentiometers P1 and P2. This series arrangement is connected between the positive and negative terminals of a voltage source, +U and −U, respectively. The lower threshold value fu is adjusted by changing the setting of the potentiometer P2, while the distance between this threshold voltage and the upper threshold voltage fo can be adjusted by means of the potentiometer P1. The output signals of the comparators V1 and V2 are applied, via several circuit elements which do not affect the logical significance of the signal and which will be described hereinafter, to an exclusive-OR-element G, the output of which is connected to the output A of the threshold value detector 10.

Figure 5A:
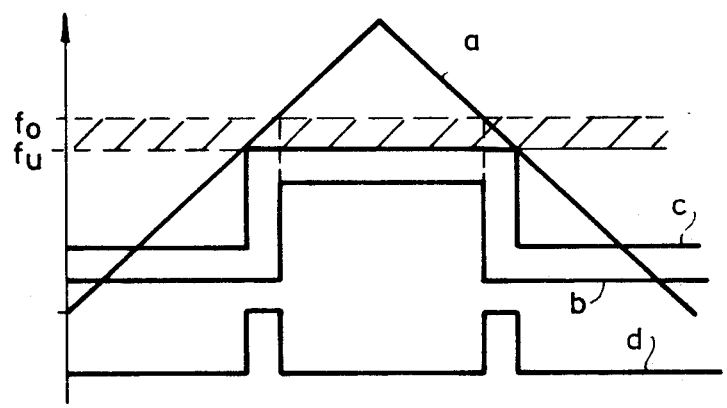
FIGS. 5a and 5b show diagrams to illustrate the operation of the threshold value detectors.

The basic function of this circuit will be described in detail with reference to FIG. 5a. As long as the voltage a on the input E is lower than the lower threshold voltage fu, the output signals b of the comparator V1 and c of the comparator V2 are low. As soon as the input voltage a exceeds the lower threshold voltage fu, the output signal c of the comparator V2 assumes a high value, and the exclusive-OR-element produces a high output signal, as denoted by the signal d. If the input voltage a further increases and also exceeds the upper threshold voltage fo, the value of the output signal p of the comparator V1 also becomes high, so that the exclusive-OR-element G receives two high input signals and thus produces a low output signal in known manner. Consequently, a positive signal is produced on the output A only as long as the input voltage a has a value between the two threshold voltages fu and fo. If the input voltage a decreases again, an output signal is generated again during the passage through the tolerance range, limited by the two threshold values, because the output signals of the comparators V1 and V2 successively assume a low value again, as can be seen in FIG. 5a.

Because the operational amplifiers used for the comparators V1 and V2 often require supply voltages which are higher than those required by the subsequent logic circuits, their output signal, being substantially equal to the supply voltage, must be limited to this lower logic level. For the comparator V1 this is effected by means of the resistors R3 and R5 and the diode D1. The values of the resistors are chosen so that in the case of a high output voltage of the comparator V1, the input voltage for the circuit S1 does not exceed the maximum permissible value, the diode D1 then being blocked and hence inactive. In the case of a negative output signal of the comparator V1, the diode D1 conducts and limits the voltage on the input of the circuit S1 to approximately zero potential. Similarly, the output signal of the comparator V2 is limited, to the level of the subsequent logic circuits by the resistors R4 and R6 and the diode D2.

The circuits S1 and S2 are Schmitt triggers so that, if the input voltage thereto crosses one of the two threshold voltages fu or fo very flatly and hence causes a very flat transition of the output signal of the comparators, the subsequent logic circuits obtain signals having steep edges. Consequently, the input signals on the comparators varying in the course of time, the exclusive OR-gate G may or may not vary its logical output signal, so that at any instant either one or none of the pattern detectors may yield a positive output signal.

Figure 5B:
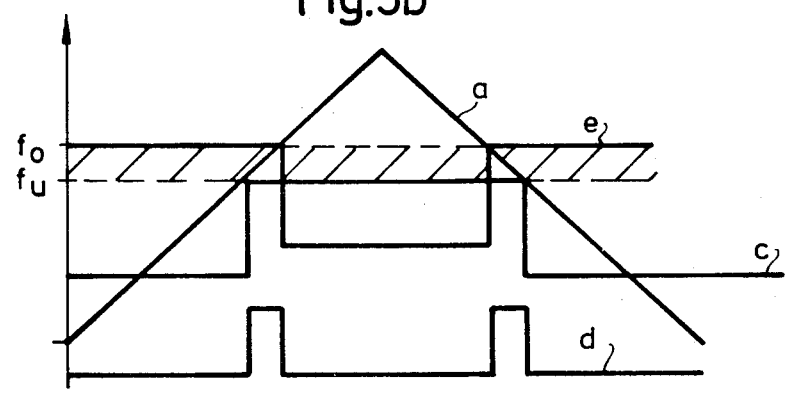
Figure 4:
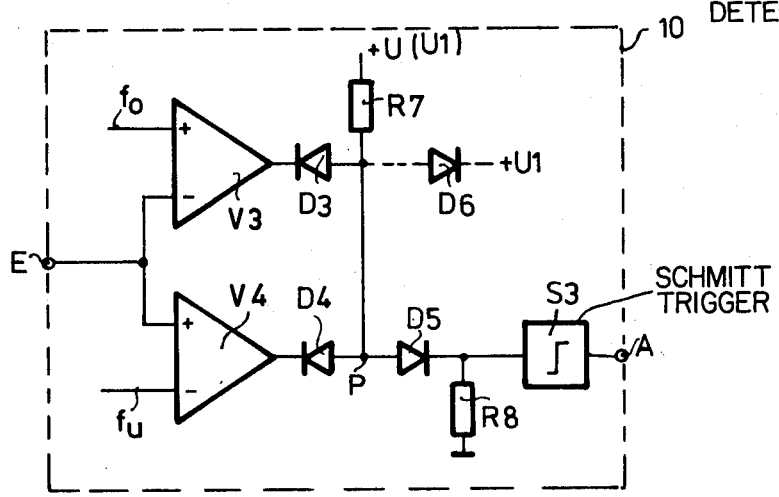
FIG. 4 shows a second embodiment of a threshold value detector.

FIG. 4 shows a further embodiment of the threshold value detector 10. Again operational amplifiers are used for the comparators V3 and V4; the input E, however, is connected to the inverting input of the upper comparator V3 and connected to the non-inverting input of the lower comparator V4. The other inputs of the comparators are respectively connected to the threshold voltages fu and fo which can be generated in the manner shown in FIG. 3. The outputs of the comparators are connected, via an AND-element comprising the diodes D3 and D4, to a point P which is connected, via a resistor R7, for example, to the positive, relatively high supply voltage U of the comparators V3 and V4. The function of this circuit will be described in detail hereinafter with reference to FIG. 5b.

As long as the voltage a on the input E is lower than the lower voltage threshold fu, the output of the comparator V3 carries a high signal, as denoted by the curve e, while the output of the comparator V4 carries a low signal in accordance with the curve c which corresponds to curve c in FIG. 5a. As soon as the input voltage a exceeds the lower threshold voltage fu, the output signal of the comparator V4 curve c also becomes positive, and hence the point P also carries a positive signal because of the AND-function as indicated by the curve d. If the input voltage a subsequently exceeds the upper threshold voltage fo, the output voltage of the comparator V3 becomes negative and hence also the voltage on the point P. When this figure is compared with FIG. 5a, it is found that on point P the same voltage variation occurs as on the output A of the circuit shown in FIG. 3, the signal on the point P, however, initially having the full voltage swing like the output signals of the comparators, so that it must also be adapted to the lower level of the subsequent logic circuits.

This is effected by means of the diode D5 and the resistor R8. When both comparators generate a high output signal, the voltage on the point P cannot exceed the value determined by the ratio R7 and R8 because of the diode D5 which is then conductive. However, if a comparator generates a negative output signal, the point P carries approximately this same negative signal, but the diode D5 is then blocked, and approximately zero potential is then present on the input of the circuit S3 as a result of the presence of the resistor R8. Another possibility of limiting the maximum positive voltage on the input of the circuit S3 is offered by the diode D6 which is connected, via the broken lines, to the point P and the voltage U1 which also serves as the supply voltage for the logic circuit elements. Due to the presence of this diode, the voltage on the point P cannot become more positive than this supply voltage. A further possibility consists in the use of the supply voltage U1 of the logic circuit elements for the resistor R7 rather than the operating voltage of the comparators V1 and V2. In the case of a positive output signal of the comparators V3 and V4, the diode D3 and D4 are always blocked anyway. The output A of the threshold value or window detector 10 is again preceded by a Schmitt trigger S3, which always provides, as described previously, an output signal having steep edges. It must be noted that in FIGS. 5a, b the signal values (curve a) and the respective tolerance limits (fo, fu) are unrelated to the electrical values of the logic levels of curves b, c, d, e.

A pattern detector 4 as shown in FIG. 2 thus produces an output signal when all connected outputs 5 of the filter bank 3 correspond to the preset pattern. For each basic signal pattern to be recognized, i.e. the phonemes in the case of human speech, for example, such a pattern detector 4 is provided.

If only single, different sounds are to be recognized, the outputs of the patterns detectors can be directly used, for example, by making the outputs control indicating devices. In the case of signal sequences consisting of a plurality of successive basic patterns, each one of which is separately recognized by a pattern detector, the sequence of recognized basic patterns is preferably temporarily stored in a store 8 as shown in FIG. 2. To this end, the outputs of the pattern detectors 4 are connected to an "address" multiplexer 7 which converts a one-bit output signal of a pattern detector into a binary number at least two bits in length which indicates the "address" of said pattern detector. Such a "multiplexer" may be constructed by those skilled in the art from known digital logic components which encode a one-out-of-n signal from an output of a specific one of the pattern detector to a binary number. Next, this binary number is applied as data the store 8. In the case of speech recognition the value of n amounts at most to about 32. Therefore, said pattern detector addresses comprise 5 bits. In the course of recognizing a word, the store 8 must accommodate the largest sequence of phonemes in a word which must be recognized. In speech recognition this sequence would have a length of at most 16 patterns, and therefore, the capacity of the store 8 would be 5×16=80 bits. The control unit 9 controls the storage in time, and comprises an address generator for the store 8. For the first elementary pattern being recognized, the control unit 9 activates the first storage position of the store 8 for writing therein the address of the corresponding pattern detector. Subsequently the next address can be activated in that control unit 9 comprises an address counter, which up on on a successfull recognition is stepped by one position. This could be realized in that the outputs of all gates 6 (FIG. 3) are combined in an OR-gate not shown. The "one" output of said OR-gate could act as a "write" command for store 8 and as a "step up by 1" command for the control unit 9. The write in of detector addresses can be repeated for each pattern recognized up to reaching a full capacity situation of the store 8.

The series of in this example at most 16 binary numbers indicates the sequence in which the basic patterns (the phonemes in the case of speech recognition) have occurred in the signal to be examined, and provides an answer as regards the word constituted by these basic patterns. For example, if the pattern detector 4(1) recognizes an "a", and the pattern detector 4(7) recognizes the nasal "n", the numerical series 1, 7, 1 would be stored as the pattern series for the spoken word "Anna". The occurrence of the end of a word can be detected by a gap detector, which signals when the acoustic energy received by the microphone 1 in FIG. 2 becomes too low. This signal is operative for resetting the address counter in control unit 9 and controlling the execution of an operation in which all of the content of store 8 is sequentially transferred to a processing entity connected to output 8A of store 8. This read-out operation is destructive and may be executed under further control by said computer. As the transfer of information to a computer is conventional technique this is not described further. The mentioned gap detector has not been indicated further, its output signal runs via line 1A. In industrial assessment of noise signals, the control unit 9 may just cycle once through all its "address" positioning under further controlling signals, e.g. a manual control button. The sequence of address digits after a word has finished is then written into said computer in which it is compared with the frequency distributions for the words of the recognition vocabulary and associated with the appropriate word in accordance with the correspondence.

As appears from the foregoing description, the arrangement can be very universally applied and arbitrary sounds and series of sounds of substantial length can be recognized, and the source of the sounds may be arbitrary. Electrical signals which have not been derived from acoustic signals can also be examined by means of this arrangement. In an industrial environment the invention may be used for testing the noise output of machines, such as electrical rotary engines, ignition engines or power turbines. It has been found that often defects can be detected from specific acoustic outputs signal patterns from machines. In this respect the invention can be used for mechanization of the testing process.

What is claimed is:

1. A preprocessor for sound signals for use in a sound recognition system comprising:
   a. a filter bank having a first input for receiving an electrical input signal which represents a sound pattern, and a plurality of first outputs for presenting a spectral component signal on each first output as filtered out from said electrical input signals and integrated over predetermined fixed time intervals;
   b. a plurality of sound vector detectors each having a plurality of window detectors which are provided with second inputs selectively connected to said first outputs for receiving at least one spectral component signal in each of two threshold detectors for comparison thereof with respective predetermined lower and upper threshold values, each window detector having a second output for outputting a binary signal indicating alternatively a "between-thresholds" or an "out-of-thresholds" situation, wherein each sound vector detector furthermore has a combinatorial logic detector for detecting coinciding "between bounds" signals outputted by all its proper window detectors, and thereupon producing a sound vector identifier signal on a third output;
   c. storage means having a detector for detecting occurrence of any sound vector identifier signal and thereupon generating a storage location access control signal for storing in a predetermined succession of storage locations sound vector representation signals successively received on a data input connected to all said third outputs;
   d. said storage means including a random access memory and an address generator therefor, the output of said detector being coupled to an incrementing input of said address generator, said storage means furthermore having a data encoder for translating any sound vector identifier signal to a corresponding binary code for storage; and
   e. each of said pattern detectors having an address associated therewith, said storage means further including a store for storing said addresses of said pattern detectors which produce an output signal at a predetermined time.

2. A preprocessor as claimed in claim 1, wherein each of said threshold value detectors comprises first and second comparators, each of said comparators having an output producing a signal of predetermined polarity, said first comparator being set at said upper threshold value, said comparators producing output signals of the same polarity if the signal on said corresponding output of said filter bank exceeds the adjusted threshold value; and further comprising an exclusive-OR-element having an input connected to said outputs of said comparators, and an output which functions as the output of said threshold value detector.

3. A preprocessor as claimed in claim 2, further comprising a plurality of Schmitt trigger circuits, each Schmitt trigger circuit having an input connected to said output of each of said comparators, and an output connected to said exclusive-OR-element.

4. A preprocessor as claimed in claim 1, wherein each of said threshold value detectors comprises first and second comparators, said first comparators being set to said lower threshold value, said second comparators being set to said upper threshold value, each of said comparators having an output for producing a signal of predetermined polarity, the output signals on said respect outputs of said first and said second comparators having opposite polarity if the signal on said corresponding output of said filter bank is outside the range of values defined between said lower threshold value and said upper threshold value; an AND-element having inputs connected to corresponding outputs of said comparator, and an output which functions as the output of said threshold value detector, said outputs of said comparators being connected to said AND-element.

5. A preprocessor as claimed in claim 4, further comprising a Schmitt trigger circuit having an input connected to said output of said AND-element.

* * * * *